May 30, 1933.  W. L. DOUDEN  1,911,492

COLOR MOTION PICTURE

Filed Aug. 3, 1929  2 Sheets-Sheet 1

INVENTOR.

William L. Douden

May 30, 1933.  W. L. DOUDEN  1,911,492
COLOR MOTION PICTURE
Filed Aug. 3, 1929  2 Sheets-Sheet 2
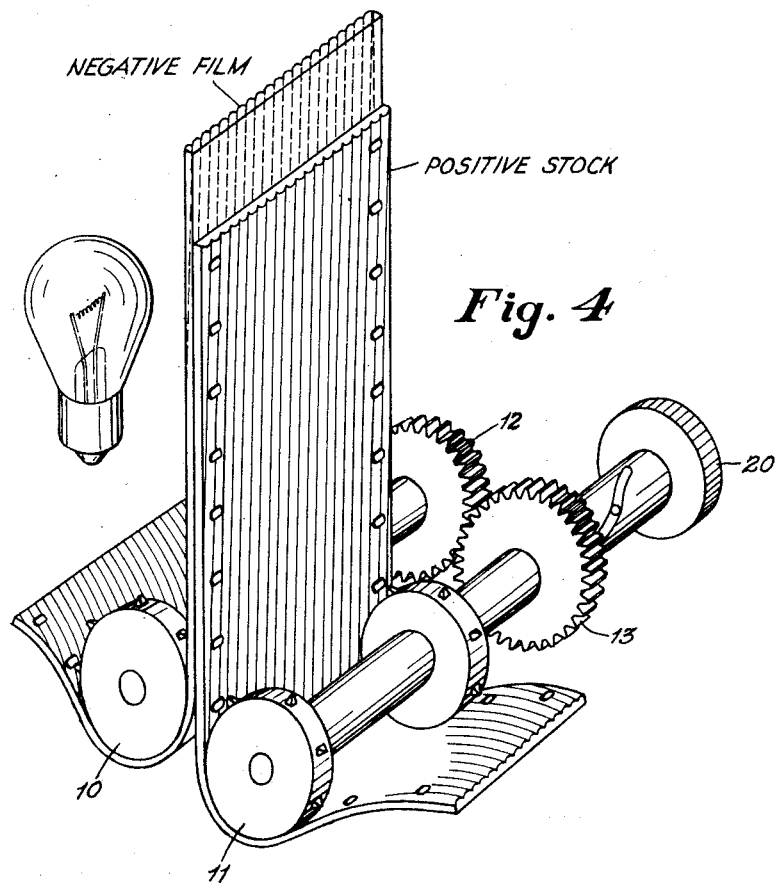
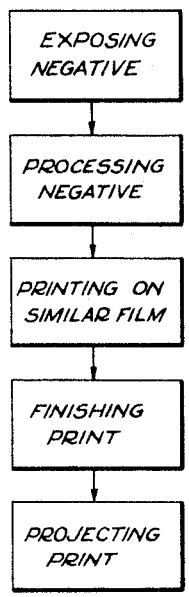
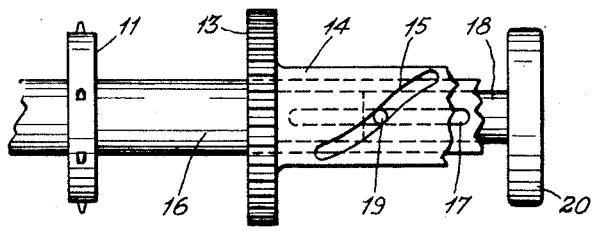
INVENTOR
WILLIAM L. DOUDEN
BY
ATTORNEY Patented May 30, 1933

1,911,492

UNITED STATES PATENT OFFICE

WILLIAM L. DOUDEN, OF BROOKLYN, NEW YORK, ASSIGNOR TO RADIO CORPORATION OF AMERICA, A CORPORATION OF DELAWARE

COLOR MOTION PICTURE

Application filed August 3, 1929. Serial No. 383,368.

This invention relates to color motion pictures and more particularly to improved processes and film for producing color motion pictures according to what is commonly known as the Berthon process and which is disclosed in United States Patent Number 992,151.

In the Berthon process, as generally performed, a film having either longitudinal or lateral cylindrical lenses or a multiplicity of small spherical lenses on the surface thereof is used. In the picture as projected, images of these lenses appear on the screen causing the appearance of projection onto a corduroy or honeycomb design screen. This is particularly objectionable in the case of motion pictures and has heretofore rendered commercial production of pictures from standard-size 35 m. m. film impossible.

One object of this invention is to provide a method of increasing the apparent number of the lenses on the film and thereby decrease their visibility.

Another object of the invention is to decrease the apparent contrast of light and shade caused by the images of the lenses and thereby decrease their visibility.

Another object of the invention is to produce a film of such nature as to produce satisfactory 35 m. m. pictures according to the Berthon process.

Another object of the invention is to provide a film having the foregoing advantages and which is capable of use in any apparatus already on the market for projecting the customary film of this type.

Another object of the invention is to secure the foregoing advantages and, at the same time, not render the film incapable of use in the reproduction of sound records therefrom.

Another object of the invention is to provide such a film which is capable of reproduction by printing.

Another object of the invention is to provide a process for the printing of such film.

Further and ancillary objects of the invention will hereafter appear and at once suggest themselves to those skilled in the art to which the invention relates by reading the following specification in connection with the accompanying drawings illustrating several preferred embodiments of my invention, wherein:

Figure 4 illustrates the method of making contact prints from this film.

Figure 5 illustrates a registering mechanism which may be used in the apparatus of Figure 4.

Figure 6 diagrammatically illustrates the process used.

Figure 1:
Figure 1 is a greatly enlarged transverse section of a film base having longitudinal cylindrical lenses as now used commercially, and likewise is an enlarged section at C2—C2 in Fig. 2 or at C5—C5 in Fig. 3.
Figure 2:
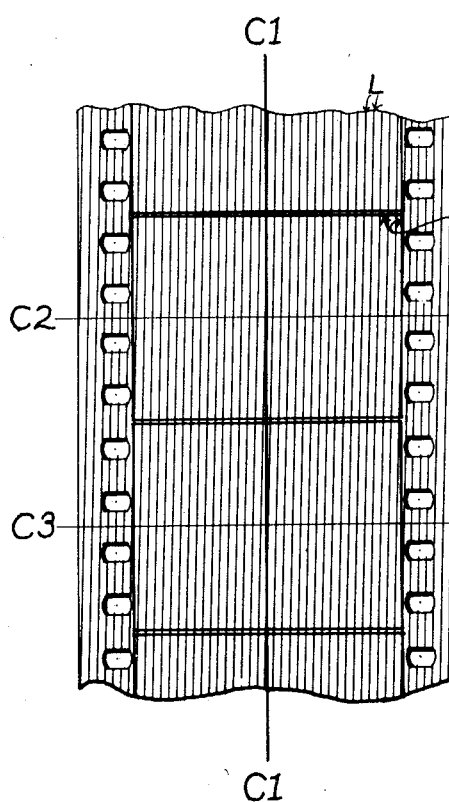
Figure 2 is a diagrammatic illustration of a preferred embodiment of my invention.
Figure 3:
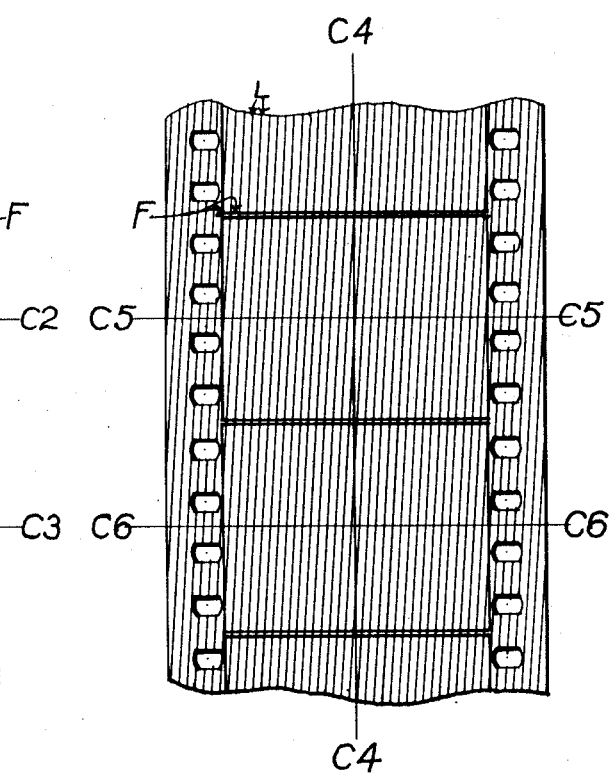
Figure 3 is a diagrammatic illustration of one of the modifications thereof.

The lines L in Figs. 2 and 3, representing the cylindrical lenses on the film, are, of course, greatly enlarged in proportion to the size of the film.

The preferred form of film, as shown in Fig. 2, is similar to the film now on the market in that the base thereof is provided with a multiplicity of minute cylindrical lenses running substantially longitudinally thereof and is otherwise, in general, constructed and used in the same way as such film.

It differs in this: The lenses are at a very slight angle to the axis of the film by a predetermined amount. In the form shown in this figure the angle is such that one lens is shifted laterally its own width in the height of two pictures. For example, the lens falling to the left of the center line of the film C1—C1 at the bottom of the picture whose center line is indicated C3—C3, is exactly centered on C1—C1 at the frame line at the top of this picture and falls to the right of C1—C1 at the top of the picture whose center line is indicated as C2—C2. This will cause the margins of the lenses in any one frame to exactly coincide with the centers of the lenses in the preceding and succeeding frames, and this, due to the persistence of vision, will apparently double the number of lenses in the picture. At the same time, the brightest portions of the image of each lens of one picture will coincide with the darkest portions of the corresponding lenses of the preceding and succeeding pictures and thereby the contrast between the bright and dark portions will be cut in half.

The film shown in Fig. 3 is identical with that shown in Fig. 2 except that the lenses are sloped one and a half times their width in the height of each picture. The function and operation thereof being identical with that of the film shown in Fig. 2.

It will be obvious that if the projection speed is increased to an appropriate degree to cause a sufficient number of pictures to be projected within the period of persistence of vision, the slope of the lenses can be chosen accordingly, so that instead of being merely apparently doubled in number and halved in contrast, they will be trebled or quadrupled in number with a corresponding decrease in contrast and that thereby the projection of 35 m. m. film to substantially any practical degree of magnification becomes commercially feasible.

It will be obvious to those skilled in the art that there are many other analogous ways in which this result might be secured.

It will be obvious that a very slight inclination of the lines, insufficient to produce uniform subdivision of the lines within the period of persistence of vision, will cause the lens elements to apparently move progressively across the picture, while if a perfectly uniform subdivision of the lines is secured they will appear to remain stationary.

This film further lends itself particularly well to printing processes in that in the use of negative film of this type and corresponding positive film stock in a printer the positive stock can be shifted longitudinally until the lines of both exactly coincide as illustrated in Fig. 4. The printing is then proceeded with as usual while watching the lines carefully for any lack of coincidence. When, due to either shrinkage or expansion of either of the films, the lines are no longer exactly superposed, it is only necessary to feed the positive stock forward a distance less than two frames in the preferred form, and a corresponding amount in the forms using a greater or less inclination of the lines, until the lines or lenses again exactly coincide. This may readily be accomplished by the apparatus shown in Figs. 4 and 5 where the two driving sprockets 10 and 11 are geared together by means of the gears 12 and 13. The relative positions of the sprockets can be changed by the framing mechanism shown more in detail in Fig. 5. The gear 13 is integral with the hollow shaft 14 which is provided with a spiral slot 15. The sprocket shaft 16 is likewise hollow and extends through the shaft 14, and the shaft 16 is provided with the longitudinal aperture 17. A longitudinally movable member 18 carrying the pin 19 fits smoothly within the shaft 16 with the pin 19 extending through the slots 15 and 17, and longitudinal movement of the member 18 by the knob 20 causes relative angular movement of the sprocket 11 and the gear 13 and therefore relative longitudinal movement of the two films. This framing mechanism is described merely to illustrate the process and is well known in the art, and it will be obvious that any other type of conventional motion picture framing mechanism which rotates a sprocket relative to its driving shaft may be used instead. The framing mechanism here described is illustrated for example in Patent Number 603,771 issued May 10, 1898. In this process the positive stock is preferably perforated at or adjacent to the printing gate, to avoid misalignment of the perforations and pictures after the correcting operation referred to above. These films can be printed either by one of the usual methods of projection printing with narrow diaphragms or by contact printing back-to-back (i. e. emulsion side to emulsion side). Lenses on the positive stock, of course, must be at the same angle as those in the negative stock but inclined in the opposite direction as viewed from the face of the film, or, in other words, the films are enantiomorphic. The lenses on the positive stock should, further, be smaller than those of the raw negative stock in the same ratio as the negative stock normally shrinks during processing, in order that they will be of exactly the same size when in the printer.

It will readily become apparent that various other modifications may be made to the invention hereinabove described, and many other applications thereof to other films of geometrical pattern will present themselves; and I believe myself to be entitled to make any and all such modifications and changes as fall fairly within the spirit and scope of the invention as defined by the hereinafter appended claims.

Having now described my invention, what I claim is:

1. A motion picture film comprising a plurality of longitudinal cylindrical lens elements inclined at such an angle that the centers of the lenses in one picture will substantially coincide with the margins of the lenses in the next succeeding and preceding pictures.

2. A motion picture film comprising a plurality of lens elements so arranged in the successive pictures appearing during the period of persistence of vision that the area occupied by any one lens element appearing at the beginning of any such period will be uniformly subdivided by the margins of other lens elements appearing during the remainder of such period.

3. The process of producing motion pictures comprising projecting an image from a film comprising a plurality of lens elements and projecting the next sequential image from such film with the lens elements shifted so as to uniformly subdivide the images of the first said lens elements.

4. The process of projecting motion pictures comprising projecting within the period of persistence of vision sequential pictures from a film comprising a plurality of lens elements and uniformly shifting said lens elements, from picture to picture, during said period at such a rate that the next succeeding picture at the end of such period has the lens elements in the same position as were those in the picture at the beginning of said period.

5. The process of printing from a film having a plurality of cylindrical lenses at a slight angle to the longitudinal axis of the film to a similar sensitive film comprising the step of shifting one of said films longitudinally in relation to the other until the lenses of the two films are substantially coincident.

6. The process of producing colored motion pictures comprising first, exposing a film comprising a multiplicity of minute cylindrical lens elements slightly inclined to the axis of the film through an optical system comprising a color filter consisting of a plurality of contiguous complementary sections to form a negative, second finishing said negative, third printing from said negative to enantiomorphic positive stock, fourth finishing the positive print, and fifth projecting successive images from said positive print through correspondingly complementary color filters on to a screen at such a rate that the area occupied by any one lens element appearing at the beginning of any period of persistence of vision will be uniformly subdivided by the margins of other lens elements appearing during the remainder of such period.

WILLIAM L. DOUDEN.